United States Patent [19]
Hetzel et al.

[11] Patent Number: 6,016,321
[45] Date of Patent: *Jan. 18, 2000

[54] METHOD FOR TRANSMITTING DIGITAL DATA IN A CONTINUOUS DATA STREAM BETWEEN TWO SUBSCRIBERS OF A NETWORK WITH A SINGLE LINE BETWEEN EACH ADJACENT SUBSCRIBER

[75] Inventors: Herbert Hetzel, Weingarten; Patrick Heck, Durmersheim; Andreas Stiegler, Karlsbad, all of Germany

[73] Assignee: Becker GmbH, Karlsbad-Ittersbach, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/595,840

[22] Filed: Feb. 2, 1996

[30] Foreign Application Priority Data

Feb. 2, 1995 [DE] Germany ............... 195 03 212

[51] Int. Cl.$^7$ ........................................ H04J 3/02
[52] U.S. Cl. ............................. 370/458; 370/463
[58] Field of Search ................... 370/460, 458, 370/452, 375, 376, 378, 379, 377, 419, 420, 461, 462, 463, 535, 442; 340/825.05

[56] References Cited

U.S. PATENT DOCUMENTS

| | | | |
|---|---|---|---|
| 4,383,315 | 5/1983 | Torng | 370/452 |
| 4,460,994 | 7/1984 | Scanlon et al. | 370/452 |
| 4,592,049 | 5/1986 | Killat et al. | 370/460 |
| 4,879,714 | 11/1989 | Maeno | 370/460 |
| 4,941,141 | 7/1990 | Hayano | 370/376 |
| 5,140,587 | 8/1992 | Mueller et al. | 370/460 |
| 5,373,505 | 12/1994 | Schmidt et al. | 370/378 |

*Primary Examiner*—Chau Nguyen
*Attorney, Agent, or Firm*—Herbert L. Lerner; Laurence A. Greenberg

[57] ABSTRACT

A method for transmitting digital data over data lines between subscribers forming data sources and data sinks, being disposed in a network having a ring structure in particular and connecting a plurality of subscribers to one another, includes transmitting the data in a format specifying a clocked sequence of individual bit groups of equal length being subdivided into partial bit groups each forming a data channel for temporarily assigning each of the partial bit groups to two subscribers in the network for a data transmission. In order to increase the transmission capacity, the data channel or channels assigned to two subscribers in the network for a data transmission are freely selectable from the existing data channels, and the data channel or channels used for the data transmission are allocated to a certain data source and a certain data sink through an allocation specification, which can be defined prior to the data transmission through the use of a control command.

6 Claims, 2 Drawing Sheets

Fig. 3

| | |
|---|---|
| 6 | 0 |
| 7 | 1 |
| l | 2 |
| m | 3 |
| n | 4 |
| ⋮ | ⋮ |
| y | 16 |
| z | 17 |

METHOD FOR TRANSMITTING DIGITAL DATA IN A CONTINUOUS DATA STREAM BETWEEN TWO SUBSCRIBERS OF A NETWORK WITH A SINGLE LINE BETWEEN EACH ADJACENT SUBSCRIBER

BACKGROUND OF THE INVENTION

FIELD OF THE INVENTION

The present invention relates to a method for transmitting digital data over data lines between subscribers forming data sources and data sinks, which are disposed in a network having a ring structure, connecting a plurality of subscribers to one another and including network segments with a single data line respectively formed between two adjacent subscribers, whereby the data in the network are transferred in a format which prescribes a clocked sequence of individual bit groups of equal length, each of which contains at least one partial bit group forming a data channel, that can be assigned temporarily to two subscribers in the network for a data transmission. The data are transferred in a continuous data stream synchronized to a clock signal. The clock signal is generated by a single subscriber. All other subscribers synchronize themselves to that clock signal. Purely asynchronous data transfer processes are differentiated therefrom as package-oriented data transmission processes, for example ATM-processes.

Methods of that type are used wherever a plurality of electrical and electronic devices that are to exchange information with one another are interlinked through the use of data lines. In the audio field, for instance, the communication between interlinked data sources on one hand, such as CD players, radio receivers and cassette tape recorders, and the associated data sinks on the other hand, such as amplifier-speaker combinations, can be controlled by such a method.

In known methods of that type, the data channels which are available for the transmission are permanently allocated to the subscribers in the network. Therefore, for each subscriber, at least one data channel must be made available. Thus the number of possible subscribers in the network is limited, and the network must always be constructed for a maximum number of subscribers. In a ring-like network structure, as many data channels as the total number needed for data transmission between all of the subscribers must be made available between all of the subscribers. One disadvantage thereof is the very great expense for equipment and administration it requires.

SUMMARY OF THE INVENTION

It is accordingly an object of the invention to provide a method for transmitting digital data, which overcomes the hereinafore-mentioned disadvantages of the heretofore-known methods of this general type and which, in particular, makes powerful data transmission possible between many subscribers in a network without major expense.

With the foregoing and other objects in view there is provided, in accordance with the invention, a method for transmitting digital data over data lines between subscribers forming data sources and data sinks, being disposed in a network having in a ring structure in particular and connecting a plurality of the subscribers to one another, which includes transmitting the data in a format specifying a clocked sequence of individual bit groups of equal length being subdivided into partial bit groups each forming a data channel, for temporarily assigning each of the partial bit groups to two subscribers in the network for a data transmission, the improvement which comprises freely selecting at least one of the data channels assigned to two subscribers in the network from the existing data channels for a data transmission; and allocating the at least one data channel used for the data transmission to a certain data source and a certain data sink through an allocation specification being definable prior to the data transmission by a control command.

Due to the free choice of channels, the total number of data channels required is reduced, since all of the channels can in principle be used by all of the subscribers, yet not all of the subscribers exchange data with one another at all times. For instance, in a network having a ring structure, if there are a plurality of audio data sources and at least one audio data sink each of which requires four data channels to transmit stereo audio data, then the transmission of these audio data can always take place over the same four channels, as long as the data transmission does not occur at the same time.

In other words, in the method of the invention, only as many data channels need to be made available as are maximally needed at the same time or maximally allowed. Through the use of the allocation specification it is assured that the applicable data are allocated correctly between the data source and the data sink, or in other words that, for example, the audio data of a CD player are transmitted to the proper audio inputs of an amplifier. The allocation specification is defined as a function of the connection to be made, through the use of a previously transmitted control command.

In accordance with another mode of the invention, each subscriber in the network has a control unit with an allocation specification, which can be defined through a control command and by way of which each data channel of the network can be allocated to that subscriber. Thus the allocation of data is not carried out through a central administration unit but rather in decentralized fashion at each subscriber in the network. This economizes on one additional administration unit, which would moreover form a bottleneck that would reduce the data transmission capacity. The data channels of the network which are to be allocated to each individual subscriber are accordingly defined in that subscriber itself, and this definition is carried out by a control command that by way of example is generated by the data source which outputs the transmitted data.

In accordance with a further mode of the invention, the allocation specification is preferably stored in memory in the form of a matrix in a read-write memory of each subscriber. The allocation specification can thus be cancelled or modified at any time by a control command. For instance, if audio data are first to be transmitted from a CD player to an amplifier through data channels 1–4 in the network, then a control command is first output by the CD player that operates through the control unit of the amplifier to establish an allocation between the data channels 1–4 and the audio inputs of the amplifier. The audio data then transmitted by the CD player are then transmitted to the audio inputs of the amplifier in accordance with this allocation specification which is present in the amplifier. If at a later time, after the completion of audio transmission from the CD player, for example, audio data are to be transmitted to the amplifier over channels 3–6 because the data channels 1 and 2 are unavailable for a transmission, then the allocation specification in the control unit of the amplifier is correspondingly modified through a further control command, with the result that the data channels 3–6 are then connected to the audio inputs of the amplifier.

In accordance with an added mode of the invention, each subscriber can have not only the network input and the network output but also a plurality of data inputs and/or data outputs. In that case, each data channel of the network can be allocated to a certain data input of the respective subscriber, and each data output of a subscriber can be allocated to a certain data channel of the network through the allocation specification.

In accordance with an additional mode of the invention, the matrix containing the allocation specification can also be used to allocate individual bits or partial bit groups of the bit groups transmitted in the network to individual bits or partial bit groups of the data inputs and/or data outputs of the subscribers, if these inputs and outputs are suitable for processing a predetermined data format that defines the sequence of individual bits or individual partial bit groups.

In accordance with a concomitant mode of the invention, the allocation specification of a subscriber can also be used to regroup the data transmitted in the network, bitwise or partial bit groupwise. Thus data that are received from a subscriber from one data channel of the network, for instance, can be forwarded by the applicable subscriber over another data channel of the network. This has the advantage of permitting the existing data channels to be optimally utilized. Moreover it is thereby possible for data from different partial bit groups of a subscriber output, or even from different outputs, to be mixed together and transmitted in common in the network.

Naturally, the allocation specification in each subscriber can also be used to connect the network input of the subscriber to the network output of the subscriber, so that the data transmitted over a certain data channel in the network can simply be passed through this subscriber, if this subscriber is neither a data source nor a data sink for the applicable data.

Other features which are considered as characteristic for the invention are set forth in the appended claims.

Although the invention is illustrated and described herein as embodied in a method for transmitting digital data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a diagrammatic illustration of an allocation specification.

DESCRIPTION OF THE PREFERRED EMBODIMENTS

Figure 1:
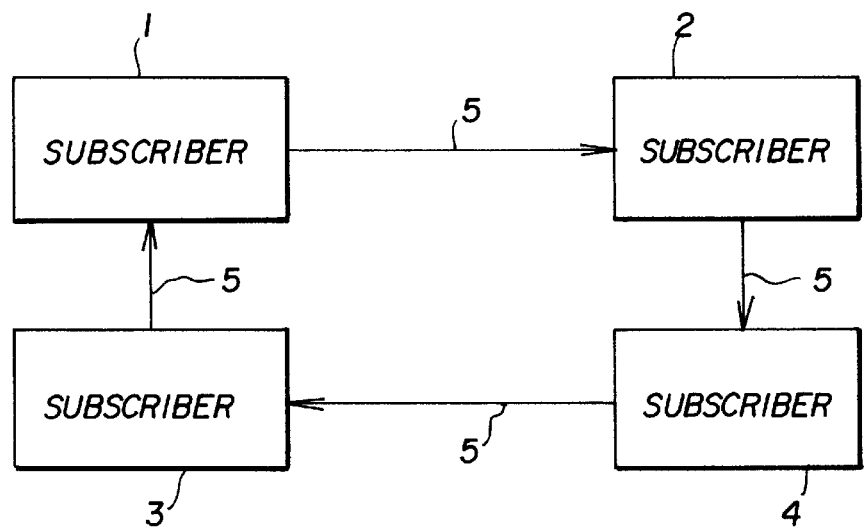
FIG. 1 is a block circuit diagram of a network having a ring structure with four subscribers.
Figure 2:
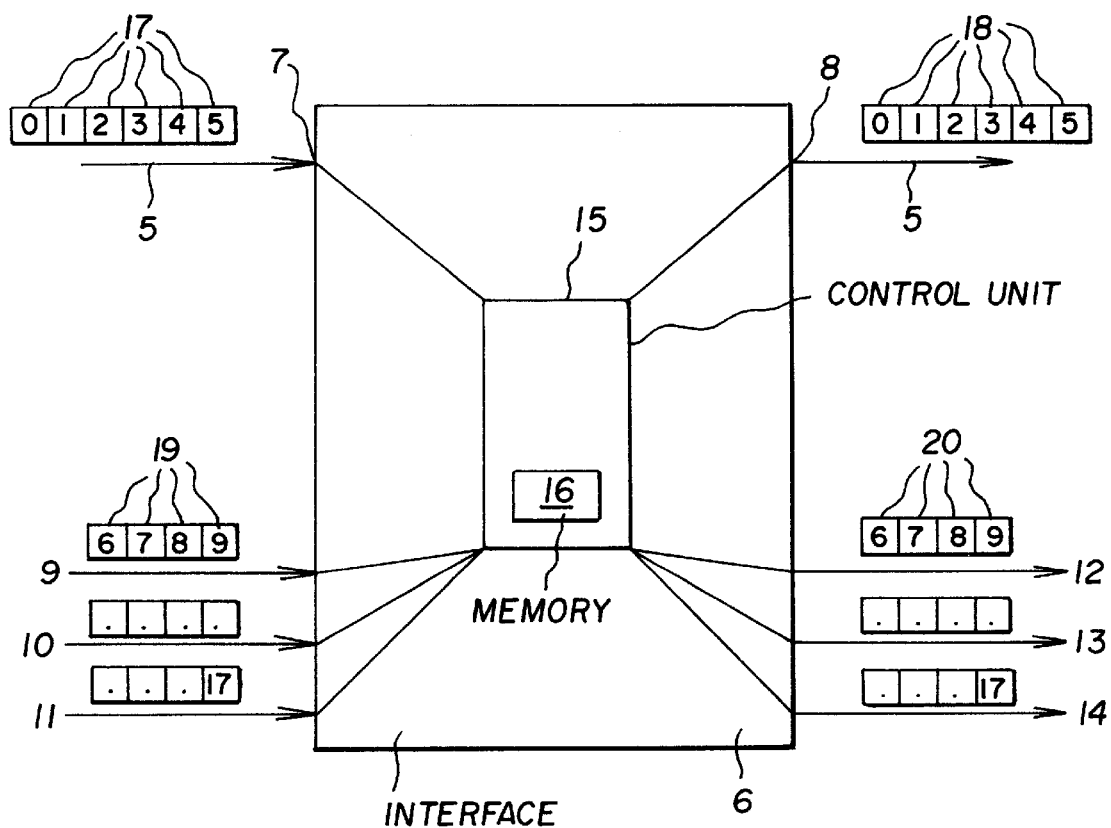
FIG. 2 is a schematic and block circuit diagram illustrating an allocation between inputs and outputs of a subscriber.

Referring now to the figures of the drawing in detail and first, particularly, to FIG. 1 thereof, there is seen a network that includes four subscribers 1, 2, 3 and 4, each of which can act as both a data source and a data sink. The four subscribers 1, 2, 3 and 4 are connected to one another over a ring-like data line 5, which by way of example can be an optical fiber. In each case, the connection between each subscriber 1, 2, 3 and 4 and the data line 5 is made through an interface 6, which has a structure that is schematically illustrated in FIG. 2 for each subscriber.

Each such interface 6 includes a network data input 7, a network data output 8, three subscriber data inputs 9, 10, 11 and three subscriber data outputs 12, 13 and 14. A control unit 15 is also present in the interface 6. The connection of the inputs 7, 9, 10 and 11 to the outputs 8, 12, 13 and 14 is controlled by way of the control unit 15.

An allocation of inputs and outputs is made in accordance with an allocation specification, which is stored in a read-write memory 16. The allocation specification takes the form of a 2×n matrix, where n is determined by the number of elements that are to be associated with one another by allocation.

In the embodiment shown, six data channels, each of which can include eight bits, for example, are available for the data transmission in the network formed by the ring line 5. The network data input 7 and the network data output 8 therefore each have six partial bit groups 17 and 18, which are referred to below as bytes. The inputs and outputs assigned to the interface inputs 9, 10, 11 and the interface outputs 12, 13, 14 of the subscribers 1–4 in the network operate with a data format that specifies four partial bit groups, which once again likewise include eight bits and are referred to below as bytes. The respective interface inputs and outputs 9, 10, 11 and 12, 13, 14 are therefore each subdivided into four respective bytes 19 and 20. If an allocation of all of the bytes 17, 19 of the interface inputs 7, 9, 10 and 11 to all of the bytes 18, 20 of the interface outputs 8, 12, 13 and 14 is to be made possible, then a 2×18 matrix is needed as is shown in FIG. 3.

The individual bytes 17, 18 and 19, 20 of the respective interface inputs and outputs are each numbered sequentially from 0 to 17.

Figure 3:
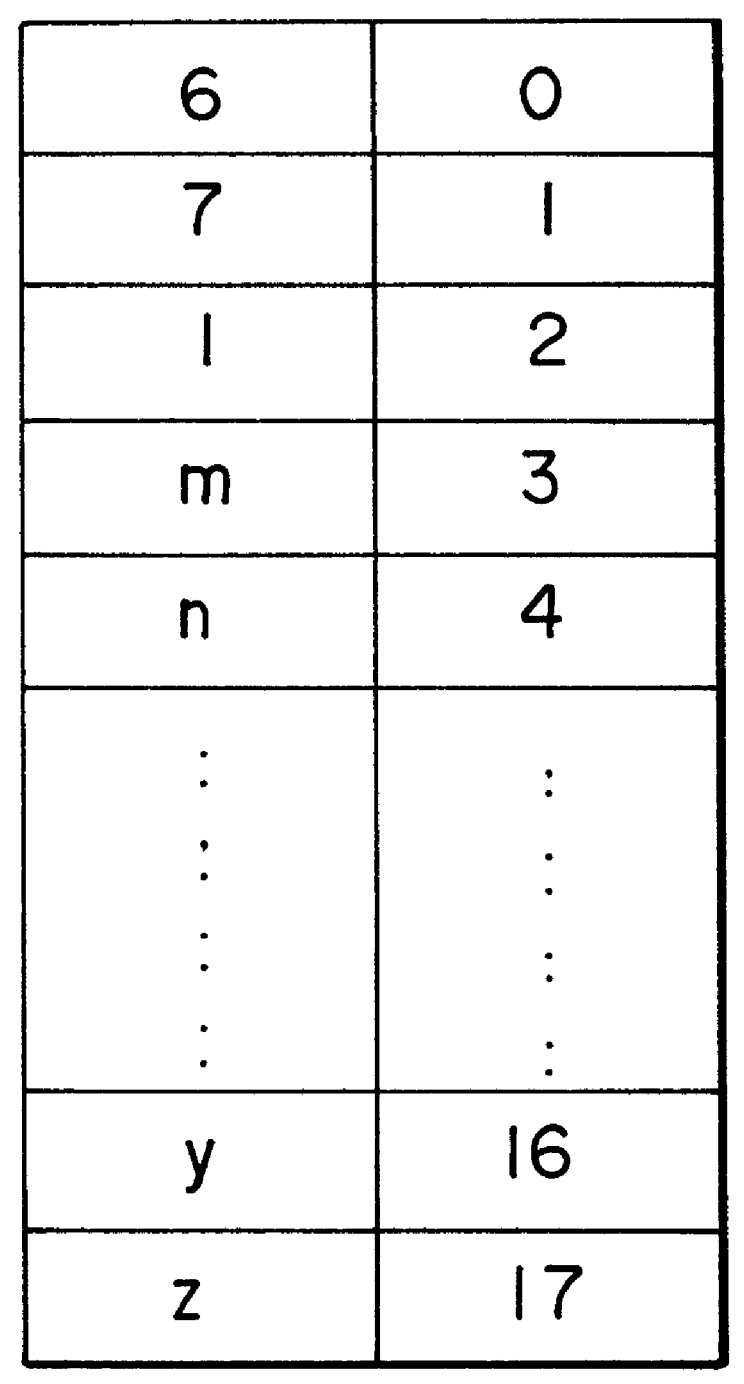

In the matrix of FIG. 3, the bytes 18 and 20 of the outputs 8 and 12 through 14 are shown with their respective numbers in the right-hand column from top to bottom in order. In the case of each output of the subscriber, the associated input byte that is to be connected to that output byte is shown in the left-hand column of the matrix. The input bytes are written into the lines of the matrix of FIG. 3 through the use of a control command through the control unit 15.

For example, if input bytes numbers 6 and 7 of the interface input 9 are connected to output bytes numbers 0 and 1 of the network output 8, then the input byte number 6 is written into the first line of the left-hand column, and the input byte number 7 is written into the second line of that column. If data for transmission are then located in the input bytes numbers 6 and 7 of the subscriber input 9, then the control unit 15, in accordance with the allocation specification stored in the matrix, allocates them to the output bytes numbers 0 and 1 of the network output 8. In other words, the data output by the present subscriber are transmitted to the first two data channels of the network.

All of the other desired connections are made and modified if needed in the same way. For instance, if upon a later transmission the first two data channels are already occupied, then a different allocation specification is written into the matrix which, for instance, connects the input bytes numbers 6 and 7 to the output bytes numbers 2 and 3, or in other words to the third and fourth data channels of the network.

Through the use of this type of allocation, an arbitrary choice of the data channel used for a transmission can be made from among the existing data channels of the network. In the same way, however, data arriving over the network data input 7 can also be shifted through the allocation specification. For instance, data that are received on the first data channel can be sent onward over the second, third or other existing data channel of the network. The data from the data inputs 9, 10 and 11 can also be shifted, for output both to the data channels of the network and to the data channels of the outputs 12, 13 or 14. It is also possible for data from the input bytes 7, 19 to be mixed together arbitrarily and output in common. All of these possibilities of bytewise allocation, mixing, regrouping, and so forth can also be carried out bitwise, if the allocation specification in the matrix is correspondingly written in bitwise fashion. The subscriber inputs 7, 9, 10 and 11 can accordingly equally well be allocated bitwise to the subscriber outputs 8, 12, 13 and 14. The number of input bytes 17, 19 and output bytes 18, 20 is also given only by way of example herein. Some other number of bytes that are to be allocated in association with one another may also be present at the network input and output 7 and 8 respectively, as well as at the internal inputs and outputs 9–11 and 12–14, respectively, of the subscriber.

This flexible bitwise or bytewise association of the inputs and outputs of a subscriber thus, in particular, permits optimal utilization of existing transmission capacities, since all of the data channels available for transmission can be used, and moreover in an arbitrary order.

We claim:

1. In a method for transmitting digital data over data lines between a plurality of subscribers forming data sources and data sinks and being disposed in a network connecting the plurality of the subscribers to one another, the method for transmitting digital data includes transmitting the data in a continuous data stream synchronized to a clock signal and containing a clocked sequence of bit groups of equal length, the improvement which comprises:

subdividing the bit groups into partial bit groups each forming a data channel, for temporarily assigning each of the partial bit groups to a first subscriber and to a second subscriber out of the plurality of subscribers for a data transmission, whereby the first subscriber is a data source and the second subscriber is a data sink;

freely selecting, initiated by any one of the plurality of subscribers, at least one of the partial bit groups forming the data channels assigned to the first and second subscribers in the network from the existing data channels for a data transmission; and allocating the partial bit groups forming the data channels according to an allocation specification specifying an allocation of each data channel to one data source and one data sink and being definable prior to the data transmission by a control command sent by one of the two subscribers.

2. The method according to claim 1, which comprises placing the subscribers forming the data sources and the data sinks in a ring structure in the network.

3. The method according to claim 1, which comprises storing the allocation specification to be defined by the control command in a control unit of each subscriber in the network, for allocating each data channel of the network to that subscriber.

4. The method according to claim 1, which comprises storing the allocation specification in memory in the form of a matrix in a read-write memory of each subscriber.

5. The method according to claim 1, which comprises assigning a network input, a network output and a plurality of data inputs and/or data outputs to the subscribers in the network, for allocating each data channel of the network to a certain data input of a subscriber, and for allocating each data output of that subscriber to a certain data channel of the network through the applicable allocation specification.

6. The method according to claim 1, which comprises regrouping the partial bit groups each forming a data channel in the network with the allocation specification of a subscriber.

* * * * *